(12) United States Patent
Peng

(10) Patent No.: US 8,922,044 B2
(45) Date of Patent: Dec. 30, 2014

(54) WAVE-DRIVEN POWER GENERATION SYSTEM

(71) Applicant: Sheng-Po Peng, Miaoli County (TW)

(72) Inventor: Sheng-Po Peng, Miaoli County (TW)

(*) Notice: Subject to any disclaimer, the term of this patent is extended or adjusted under 35 U.S.C. 154(b) by 0 days.

(21) Appl. No.: 14/225,931

(22) Filed: Mar. 26, 2014

(65) Prior Publication Data

US 2014/0217736 A1    Aug. 7, 2014

Related U.S. Application Data

(63) Continuation-in-part of application No. 13/760,162, filed on Feb. 6, 2013, now Pat. No. 8,786,121.

(51) Int. Cl.
| | | |
|---|---|---|
| *F03B 13/22* | (2006.01) | |
| *F03B 13/18* | (2006.01) | |
| *F03B 17/02* | (2006.01) | |
| *F03B 17/04* | (2006.01) | |

(52) U.S. Cl.
CPC ............... *F03B 13/18* (2013.01); *F03B 17/025* (2013.01); *F03B 13/1815* (2013.01); *Y10S 415/916* (2013.01); *F03B 17/04* (2013.01)
USPC ............................................. 290/53; 415/916

(58) Field of Classification Search
CPC ............................ Y02E 10/38; F03B 13/1815
USPC ............................................. 290/53; 415/916
See application file for complete search history.

(56) References Cited

U.S. PATENT DOCUMENTS

| | | | | |
|---|---|---|---|---|
| 4,125,346 A * | 11/1978 | Pickle | ............................ | 417/332 |
| 4,684,815 A * | 8/1987 | Gargos | ............................ | 290/53 |
| 4,686,377 A * | 8/1987 | Gargos | ............................ | 290/53 |
| 5,499,889 A * | 3/1996 | Yim | ............................ | 405/76 |
| 8,035,243 B1 * | 10/2011 | Mesa | ............................ | 290/53 |
| 8,786,121 B1 * | 7/2014 | Peng | ............................ | 290/53 |
| 2014/0239642 A1 * | 8/2014 | Peng et al. | ............................ | 290/53 |

* cited by examiner

*Primary Examiner* — Michael Zarroli
(74) *Attorney, Agent, or Firm* — Jackson IPG PLLC

(57) ABSTRACT

A wave-driven power generation system that uses a motor reducer to turn a rocker bar in moving wave-making barrels alternatively up and down, causing creation of water waves in water reservoirs so that float boards in the water reservoirs are moved by created water waves to rotate a transmission gearbox that is coupled to a power generating unit through an inertia wheel set, and thus, the power generating unit is driven to generate electricity.

8 Claims, 5 Drawing Sheets

WAVE-DRIVEN POWER GENERATION SYSTEM

CROSS REFERENCE TO RELATED ART

This Invention is a continuation-in-part of U.S. Ser. No. 13/760,162, entitled "Wave-Making and Power Generating System" filed on Feb. 6, 2013 and currently pending.

BACKGROUND OF THE INVENTION

1. Field of the Invention

The present invention relates to power generation technology, and more particularly to a wave-driven power generation system, which moves wave-making barrels in water reservoirs to create water waves, causing float boards to move a transmission gearbox for transferring rotary driving force through an inertial wheel set to a power generating unit in generating electricity.

2. Description of the Related Art

Although nuclear power is an effective source of power, the problems of nuclear waste disposal and nuclear power safety have always been controversial. At present, thermal power can provide livelihood electricity, however it is not in line with the principles of environmental protection and its cost is also high. Further, wind-driven and solar power generators are environmentally friendly, however, their cost is high. Further, wind-driven and solar power generators are subject to weather restrictions. Further, hydroelectricity is the production of electrical power through the use of the gravitational force of falling or flowing water, however, the level of gravitational force of falling or flowing water affects the performance of hydroelectric power generation. Further, hydroelectric power plants must be built near dams and water sources, so they are likely to be small and geographically limited.

Therefore, it is desirable to provide a power generation system that is free from geographical limitations, cost-effective and environmentally friendly, and that does not cause pollutions or produce waste materials.

SUMMARY OF THE INVENTION

The present invention has been accomplished under the circumstances in view. It is the main object of the present invention to provide a wave-driven power generation system, which uses a low power consumption motor reducer to move wave-making barrels in water reservoirs for creating water waves, causing float boards to move a transmission gearbox for transferring rotary driving force through an inertial wheel set to a power generating unit in generating electricity.

It is another object of the present invention to provide a wave-driven power generation system, which is free from geometrical limitations, less expensive for a wide range of applications and in line with the principles of environmental protection, and, which does not cause pollution or produce waste materials and allows repeated use of the supplied water.

DETAILED DESCRIPTION OF THE INVENTION

Figure 1:
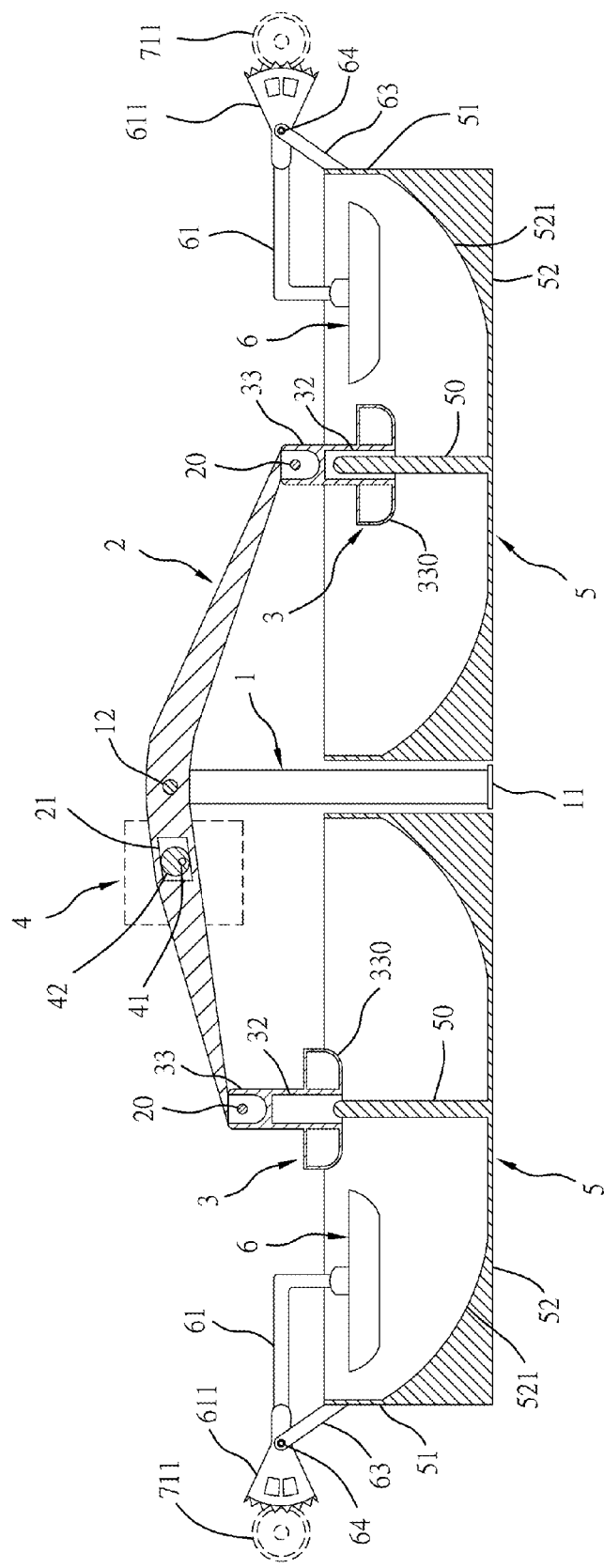
FIG. 1 is a schematic sectional side view of a wave-driven power generation system in accordance with the present invention.
Figure 2:
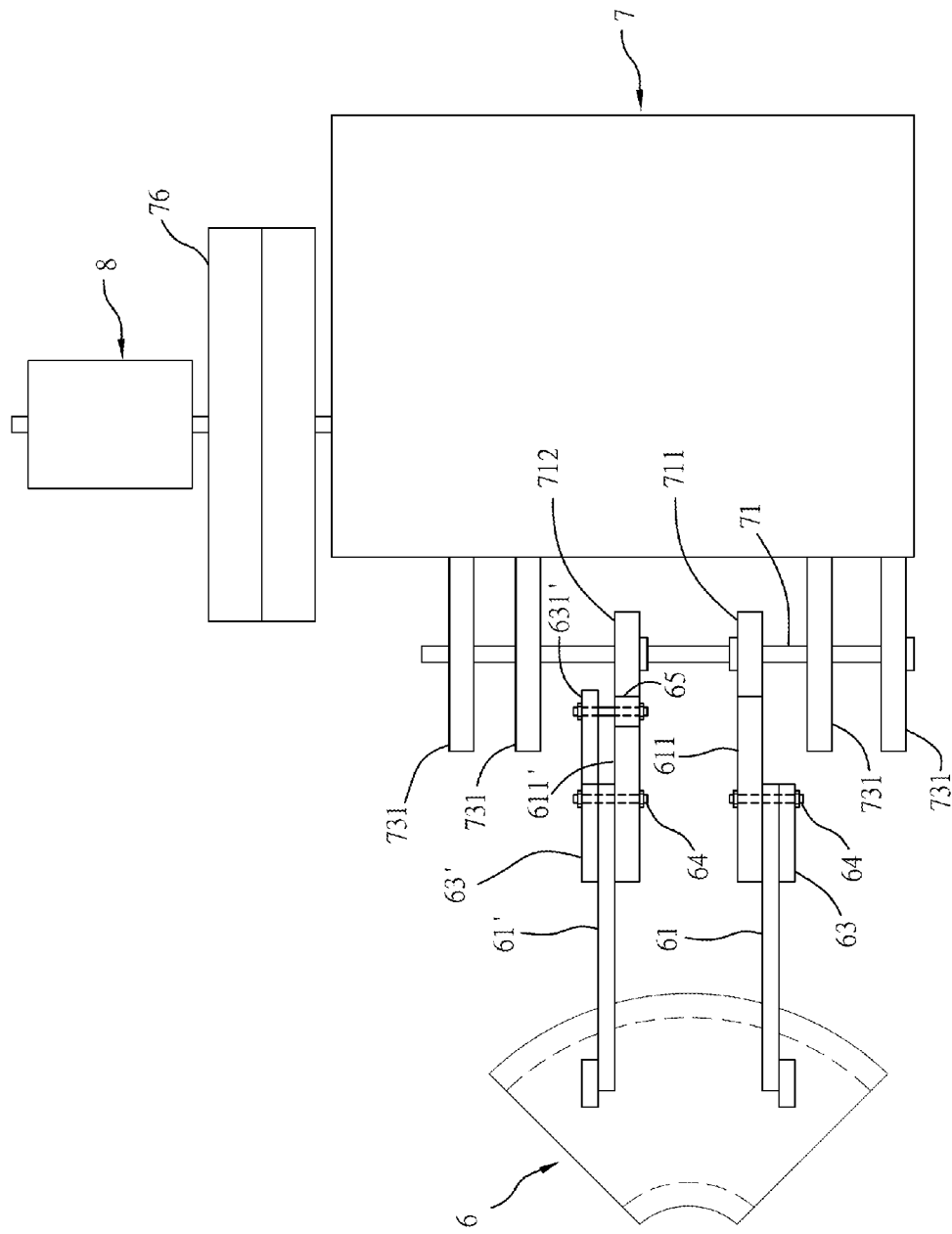
FIG. 2 is a schematic top plain view of a part of the present invention, illustrating the coupling arrangement between one float board and the associating transmission gearbox.
Figure 3:
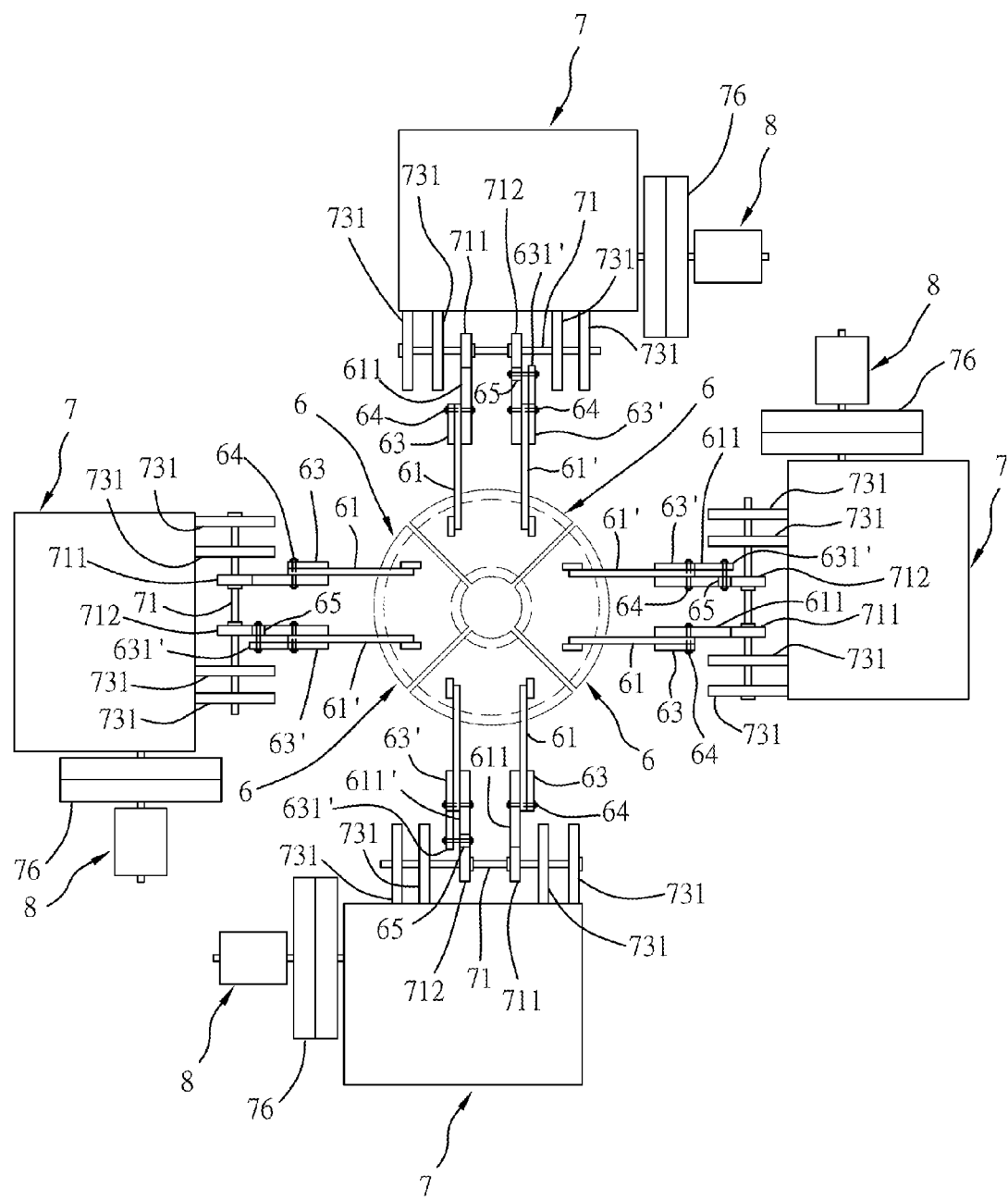
FIG. 3 is a schematic top plain view illustrating one application example of the present invention.
Figure 4:
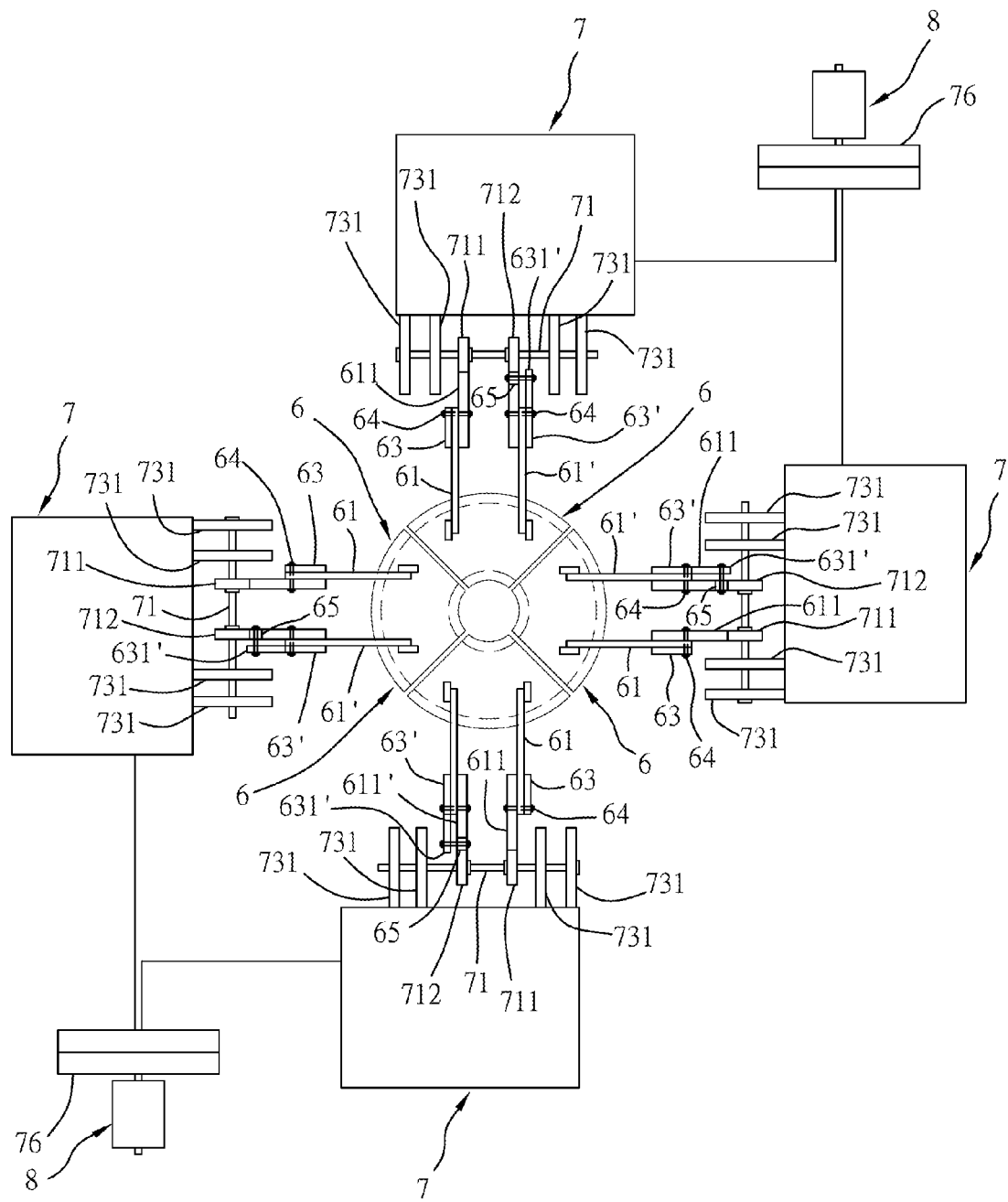
FIG. 4 is a schematic top plain view illustrating another application example of the present invention.

Referring to FIGS. 1-5, a wave-driven power generation system in accordance with the present invention is shown. The wave-driven power generation system comprises:

an upright support frame 1 having a bottom end 11 thereof fixedly fastened to the ground or a floor in a building and an opposing top end thereof spaced above the ground or floor at a predetermined distance and provided with a pivot connection member 12;

a rocker bar 2 pivotally coupled to the pivot connection member 12 of the upright support frame 1 in a balanced manner and having a coupling groove 21 located at one side thereof at a suitable location;

a plurality of wave-making barrels 3 having respective top handles 33 thereof respectively and symmetrically connected to two distal ends of the rocker bar 2;

a motor reducer 4 having an eccentric wheel 42 mounted at an output shaft 41 thereof and coupled to the coupling groove 21 of the rocker bar 2 and rotatable to rotate the rocker bar 2 alternatively up and down;

at least one water reservoir 5 holding a proper amount of water;

at least one set of first support bar 63 and second support bar 63' (see FIG. 2) mounted at an upright peripheral wall 51 of the at least one water reservoir 5, each second support bar 63' having an extension portion 631';

a driven gear 65 pivotally mounted at the extension portion 631' of each second support bar 63';

a respective pivot pin 64 respectively and pivotally mounted at each first support bar 63 and each second support bar 63';

a first gear wheel 611 fixedly mounted at the pivot pin 64 at each first support bar 63;

a second gear wheel 611' fixedly mounted at the pivot pin 64 at each second support bar 63' and meshed with the driven gear 65 at the respective second support bar 63';

at least one float board 6 supported on and movable up and down with the water level in the at least water reservoir 5;

at least one set of first connection rod 61 and second connection rod 61' respectively fixedly connected to the at least one float board 6 (see FIGS. 1-3), the first connection rod 61 and second connection rod 61' each having respective one end thereof fixedly connected to the associating float board 6 and respective opposite end thereof respectively pivotally connected to one respective first gear wheel 611 and one respective second gear wheel 611' by means of the respective pivot pins 64 at the respective first support bar 63 and second support bar 63' (see FIG. 2);

at least one driven shaft 71 respectively disposed corresponding to the at least one float board 6;

a first unidirectional ratchet wheel 711 mounted at each driven shaft 71 and meshed with one respective first gear wheel 611;

a second unidirectional ratchet wheel 712 mounted at each driven shaft 71 and meshed with one respective driven gear 65 (see FIGS. 2 and 3);

at least one transmission gearbox 7;

at least one transmission chain wheel or belt wheel 731 respectively coupled between the at least one transmission gearbox 7 and the at least one driven shaft 71 (see FIGS. 2 and 3);

at least one power generation unit 8; and at least one inertia wheel set 76 respectively coupled between the at least one transmission gearbox 7 and the at least one power generation unit 8 for driving the at least one power generation unit 8 to generate electricity.

Thus, when the motor reducer 4 is started to rotate the output shaft 41, the eccentric wheel 42 is rotated to bias the rocker bar 2 on the upright support frame 1, moving the wave-making barrels 3 alternatively up and down in the at least one water reservoir 5, thereby making waves in the water in the at least one water reservoirs 5. At this time, each float board 6 floats up and down with the water waves in the respective water reservoir 5, causing the associating first and second connection rods 61 and 61' to rotate the respective first gear wheel 611 and second gear wheel 611' respective to the associating first support bar 63 and second support bar 63', and thus the respective first unidirectional ratchet wheel 711 and second unidirectional ratchet wheel 712 are driven by the respective first gear wheel 611 and second gear wheel 611' to rotate the respective driven shaft 71. During rotation of the driven shaft 71, the respective at least one transmission chain wheel or belt wheel 731 is driven to rotate the respective transmission gearbox 7, enabling the rotary driving force to be transferred through the respective at least one inertia wheel set 76 to the respective power generation unit 8, causing the respective power generation unit 8 to generate electricity.

Further, the top handle 33 of each wave-making barrel 3 is pivotally connected to one end of the rocker bar 2 with a respective pivot connection member 20. Further each wave-making barrel 3 has a vertically extended sliding slot 32 axially slidably coupled to a respective upright guide post 50 in one respective water reservoir 5 to facilitate smooth sliding movement.

Further, the float board 6 is selected from the material group of metal, cement, metal reinforced cement and cement mixture. During movement of the wave-making barrels 3 to make water waves in the at least one water reservoir 5, the thrust force of the water waves and the buoyancy of water can lift each float board 6. When the water waves decline, each float board 6 can drop subject to its gravity weight.

Further, the inner surface 521 of the bottom wall 52 of each water reservoir 5 curves smoothly inward, facilitating formation of water waves. Further, each water reservoir 5 can be made of high-strength metal, high-strength plastics, cement, cement mixture, or any other high-strength material, in the shape of a circular, rectangular or multilateral drum or water pool, or a top-open water container. Further, the amount of water contained in each water reservoir 5 is preferably above ⅔ of its overall capacity.

Further, each wave-making barrel 3 has a smoothly arched bottom wall 330, facilitating making water waves.

Figure 5:
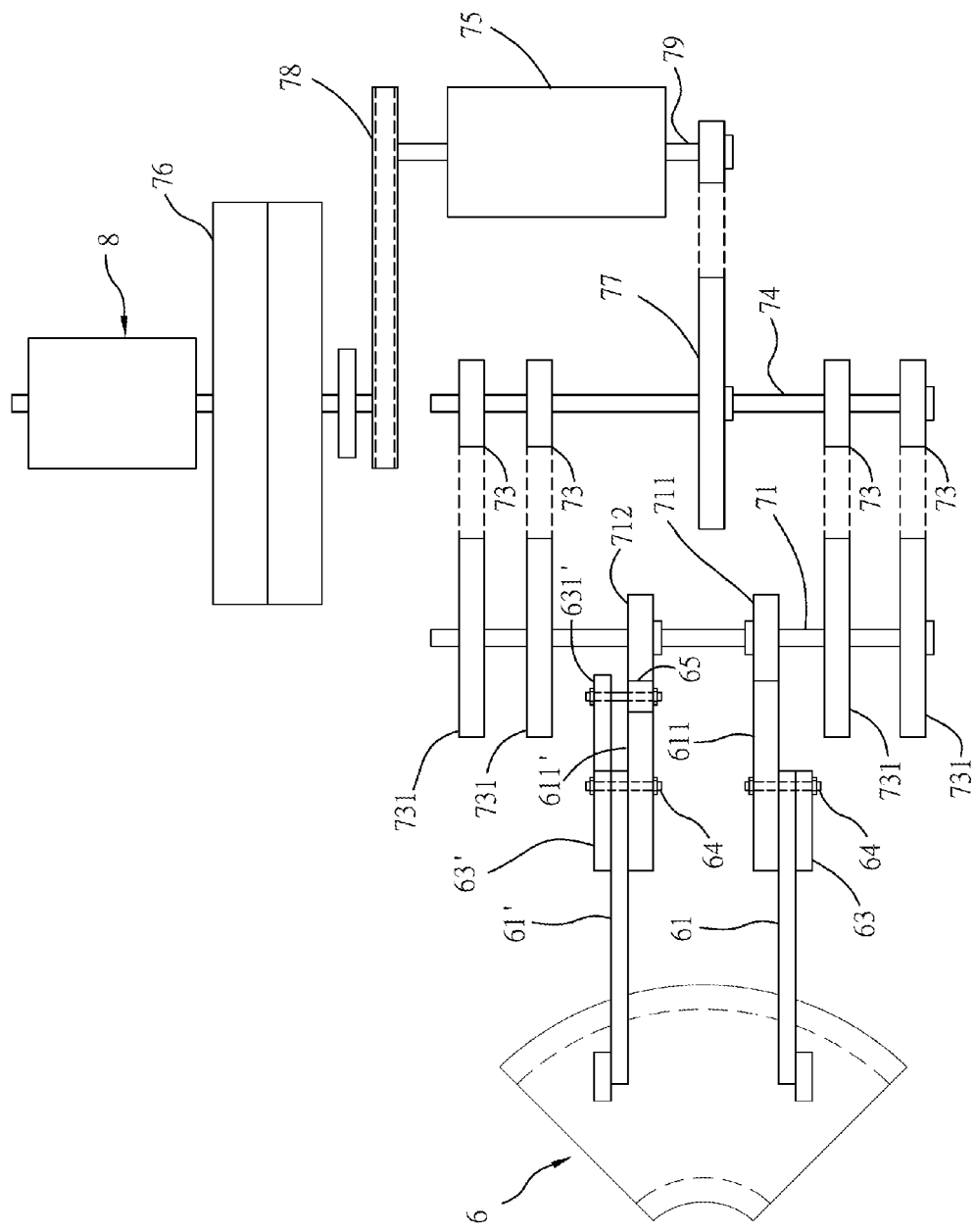
FIG. 5 corresponds to FIG. 2, illustrating the internal arrangement of the transmission gearbox.

Further, referring to FIG. 5, the aforesaid transmission gearbox 7 coupled between the at least one transmission chain wheel or belt wheel 731 and the at least one inertia wheel set 76 (see FIG. 2) comprises a transmission shaft 74, at least one first chain or belt transmission mechanism 73 mounted at the transmission shaft 74 and coupled to the at least one transmission chain wheel or belt wheel 731, a second chain or belt transmission mechanism 77 mounted at the transmission shaft 74, a reduction gear set 75 having an input shaft 79 coupled to the second chain or belt transmission mechanism 77, and a third chain or belt transmission mechanism 78 coupled between the reduction gear set 75 and the inertia wheel set 76 for driving the respective power generating unit 8 through the inertia wheel set 76.

Further, as shown in FIG. 3, when the first and second connection rods 61 and 61' of each float board 6 are forced to rotate the respective driven shaft 71, the respective at least one transmission chain wheel or belt wheel 731 is driven to rotate the respective transmission gearbox 7, enabling the rotary driving force to be transferred through the respective inertia wheel set 76 to the respective power generating unit 8 so that the respective power generating unit 8 can be driven to generate electricity. In the application example shown in FIG. 3, 4 pieces of float board 6 are respectively arranged for rotating one respective transmission gearbox 7, enabling the rotary driving force to be transferred through one respective inertia wheel set 76 to one respective power generating unit 8. In the application example shown in FIG. 4, two transmission gearboxes 7 are linked to one power generating unit 8 through one respective inertia wheel set 76.

Further, a plurality of float boards 6 can be linked together by a movable connector between each two adjacent float boards 6 to float in each water reservoir 5.

In conclusion, the invention provides a wave-driven power generation system that has advantages and features as follows:

1. Simply providing electric power to the motor reducer 4, the rocker bar 2 can be turned to move the wave-making barrels 3 alternatively up and down in creating water waves in each water reservoir 5, causing each float board 6 to rotate one respective transmission gearbox 7 for the transfer of the rotary driving force through each inertial wheel set 76 to one respective power generating unit 8, and therefore each power generating unit 8 can effectively generate electricity with less power consumption.

2. The wave-driven power generation system is free from geometrical limitations, and does not cause pollution or produce waste materials. Further, the water contained in each water reservoir 5 can be repeatedly used. Therefore, the wave-driven power generation system is in line with the principles of environmental protection. When compared to solar or wind-driven power generation systems, the wave-driven power generation system of the invention is less expensive for a wide range of applications.

What is claimed is:

1. A wave-driven power generation system, comprising:
an upright support frame fixedly fastened to a floor;
at least one water reservoir respectively holding a predetermined amount of water;
a rocker bar pivotally mounted at a top end of said upright support frame in a balanced manner and drivable by an external force to turn alternatively up and down on said upright support frame, said rocker bar having a coupling means;
a plurality of wave-making barrels symmetrically coupled to two opposite ends of said rocker bar and movable with said rocker bar to cause the water in each said water reservoir to create water waves, each said wave-making barrel having a top handle pivotally coupled to one end of said rocker bar;
a motor reducer for turning said rocker bar alternatively up and down on said upright support frame, said motor reducer comprising an output shaft and an eccentric wheel mounted at a distal end of said output shaft and coupled to said coupling means of said rocker bar;
at least one float board floating up and down with created water waves in each said water reservoir, each said float board having a first connection rod and a second connection rod fixedly connected thereto in a parallel manner;
at least one power generating unit rotatable to generate electricity;

at least one transmission gearbox respectively coupled between the first connection rod and second connection rod of each said float board and said at least one power generating unit for transferring a rotary driving force from said at least one float board to said at least one power generating unit; and at least one inertial wheel set respectively coupled between said at least one transmission gearbox and said at least one power generating unit.

2. The wave-driven power generation system as claimed in claim 1, further comprising:

at least one set of first support bar and second support bar respectively mounted at an upright peripheral wall of each said water reservoir, said second support bar having an extension portion;

a driven gear respectively pivotally mounted at the extension portion of each said second support bar;

a pivot pin respectively and pivotally mounted at each said first support bar and each said second support bar and respectively connected to one of the first connection rod and second connection rod of each said float board;

a first gear wheel fixedly mounted at the pivot pin at each said first support bar;

a second gear wheel fixedly mounted at the pivot pin at each said second support bar and meshed with the driven gear at the respective said second support bar;

at least one driven shaft coupled with said at least one transmission gearbox;

a first unidirectional ratchet wheel mounted at each said driven shaft and meshed with one respective said first gear wheel;

a second unidirectional ratchet wheel mounted at each said driven shaft and meshed with one respective said driven gear; and at least one transmission wheel respectively coupled between said at least one transmission gearbox and said at least one driven shaft.

3. The wave-driven power generation system as claimed in claim 2, wherein each said transmission gearbox comprises a transmission shaft, at least one first chain or belt transmission mechanism mounted at said transmission shaft and coupled to one respective said transmission wheel, a second chain or belt transmission mechanism mounted at said transmission shaft, a reduction gear set having an input shaft thereof coupled to said second chain or belt transmission mechanism, and a third chain or belt transmission mechanism coupled between said reduction gear set and one respective said inertia wheel set.

4. The wave-driven power generation system as claimed in claim 1, wherein each said water reservoir comprises at least one upright guide post; the top handle of each said wave-making barrel is pivotally connected to one end of said rocker bar with a respective pivot connection member; each said wave-making barrel comprises a vertically extended sliding slot axially slidably coupled to one said upright guide post in one said water reservoir.

5. The wave-driven power generation system as claimed in claim 1, wherein each said float board is made of metal having a predetermined gravity weight.

6. The wave-driven power generation system as claimed in claim 1, wherein each said water reservoir is made of a high-strength material selected from the group of high-strength metal, high-strength plastics, cement and cement mixture in the shape of a top-open water container; each said water reservoir having an inner surface of a bottom wall thereof curved smoothly inward; the amount of water contained in each said water reservoir is preferably above ⅔ of the overall capacity of each said water reservoir.

7. The wave-driven power generation system as claimed in claim 1, wherein said coupling means of said rocker bar is a coupling groove.

8. The wave-driven power generation system as claimed in claim 1, wherein a plurality of said float boards are linked together by a movable connector between each two adjacent said float boards to float in each said water reservoir.

* * * * *